United States Patent [19]
Ishitobi

[11] Patent Number: 5,626,640
[45] Date of Patent: May 6, 1997

[54] COMPOSITION ADAPTED FOR USE IN TEXTURING PROCESS FOR MAGNETIC DISC

[75] Inventor: Ken Ishitobi, Tokyo, Japan

[73] Assignee: Showa Denko K.K., Tokyo, Japan

[21] Appl. No.: 631,174

[22] Filed: Apr. 12, 1996

[30] Foreign Application Priority Data

Apr. 13, 1995 [JP] Japan ............................. 7-88406

[51] Int. Cl.$^6$ ............................................. B24B 3/34
[52] U.S. Cl. ............................. 51/306; 51/307; 51/309
[58] Field of Search .............................. 51/306, 307, 309

[56] References Cited

U.S. PATENT DOCUMENTS

| | | | |
|---|---|---|---|
| 4,035,163 | 7/1977 | McLaughlin et al. | 51/306 |
| 4,544,377 | 10/1985 | Schwen | 51/306 |
| 4,952,240 | 8/1990 | Smith | 51/306 |

FOREIGN PATENT DOCUMENTS

| | | |
|---|---|---|
| 52-11859 | 1/1977 | Japan . |
| 62-135598 | 6/1987 | Japan . |
| 4224139 | 8/1992 | Japan . |
| 6122868 | 5/1994 | Japan . |
| 6220187 | 8/1994 | Japan . |

OTHER PUBLICATIONS

Webster, *New Collegiate Dictionary* 1977 (no month).

*Primary Examiner*—Deborah Jones
*Attorney, Agent, or Firm*—Sughrue, Mion, Zinn, Macpeak & Seas

[57] ABSTRACT

A composition capable of forming uniform textured streaks and eliminating or reducing the occurrence of protrusions to as few as possible on the ground layer (the ground layer of a magnetic layer) of a magnetic disc. The composition comprises minute grains or powder of diamond etc., an alkylene gycol monoalkyl ether and a fatty acid or a metallic salt thereof.

12 Claims, 1 Drawing Sheet

COMPOSITION ADAPTED FOR USE IN TEXTURING PROCESS FOR MAGNETIC DISC

BACKGROUND OF THE INVENTION

1. Field of the Invention

The present invention relates to a composition adapted for use in a texturing process, by which texturing streaks are formed on a magnetic disc, particularly, a composition capable of uniformly forming streaks on the surface of a magnetic disc.

2. Description of the Prior Art

In order to meet the increasing demands for higher recording densities of magnetic discs, the distance between the magnetic disc and the magnetic head must be smaller, e.g., in the order of 0.1 to 0.3 µm. Therefore, it is necessary that the surface of a magnetic disc is as flat as possible. However, such a flatness of the surface of a magnetic disc is apt to cause a problem in operation, i.e., adhesion of the magnetic head to the surface of the magnetic disc (so-called as "adsorption of the magnetic head"), which either stops the rotation of the magnetic disc, or hinders the redrive of the magnetic disc after stopping, and, thus, makes starting of hard disc drive impossible. In order to prevent such an "adsorption of the magnetic disc" a so-called texturing process is applied on the ground layer of the magnetic disc (the ground layer of the magnetic layer).

The texturing process forms minute streaks on the surface of the ground layer of a magnetic disc, by scrubbing the surface of the ground layer of the magnetic disc either with a polishing tape, on which polishing grains having a predetermined grain size are cohered, or with a suspension of polishing grains. While it is necessary that the formed streaks have a certain size, in order to prevent "adsorption of the magnetic head" it is also necessary to satisfy the requirement that the streaks must not be so large as to cause the floating magnetic head to crash, and, in addition, must be formed as uniformly as possible.

In the prior art, a slurry, which is formed by mixing polishing grains of diamond or alumina in a polishing liquid, has been used as the composition adapted for use in the texturing process, in order to form such streaks on the surface of the magnetic disc.

SUMMARY OF THE INVENTION

In order to improve the recording density of a magnetic disc, it is necessary to minimize the surface roughness of the textured surface of the ground layer of a magnetic disc, to reduce the floating height of a magnetic head, and also to decrease number of minute burrs (chips formed by the cutting grains and left unseparated from the ground layer). When a composition of the prior art was applied to a texturing process, a number of such burrs were formed, and thus the magnetic head crashed against such burrs, and errors were increased in recording and reading, and also the CSS (contact start and stop) characteristics were deteriorated. This phenomena led to obstructions to improving the performance of the magnetic disc.

It is the primary object of the present invention to provide a composition for forming uniform texturing streaks, which are capable of removing or reducing, as much as possible, the occurrence of burrs, as set forth above, on the surface of the ground layer (the ground layer of the magnetic layer) of a magnetic disc.

Other and further objects and advantages of the present invention will appear in the following description.

The object of the present invention is accomplished by a composition adapted for use in texturing process, the composition comprising:

(A) minute grains or powder of at least one material selected from the group consisting of diamond, CBN (cubic boron nitride), alumina and silicon carbide;

(B) an alkylene glycol monoalkyl ether having the general formula:

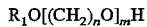

$$R_1O[(CH_2)_nO]_mH$$

in which $R_1$ represents an alkyl group of a straight or branched chain having 1 to 4 carbon atoms, m is an integer of 1 to 3, and n is an integer of 2 or 3, and;

(C) at least one compound selected from the group of fatty acids having 10 to 22 carbon atoms or a metallic salt thereof.

First, the minute grains or powder adapted for use in the present invention will be described.

Minute grains or powder of alumina or silicon carbide may be an artificial grinding material defined by JIS R6111-1987 or a similar material and have a grain size defined by JIS R6001-1987 or a similar method. In addition, powder of alumina or silicon carbide adapted for use in sintering may be applied to the present invention.

Minute grains or powder of diamond may be natural or artificial diamond for industrial use having a grain size defined by JIS R6001-1987. In addition, diamond having the maximum grain size of 10 µm or less and exhibiting a specified grain distribution may be also used in the present invention.

Minute grains or powder of CBN may be industrially synthesized and may have a grain size as small as that of diamond set forth above.

The maximum grain size of the minute grains or powder adapted for use in the present invention is preferably 5 µm or less, more preferably 4 µm or less. If the maximum grain size is larger than 5 µm, the texturing streaks formed will be too large, and scratches (deep linear grooves formed by texturing process on the surface of a magnetic disc, having their depth and width distinguished from those of the other streaks) will be generated, and, thus, such a grain size is not preferable.

The average grain size is preferably 0.1 to 3 µm. If it exceeds 3 µm, the streaks formed by texturing process will be too large and scratches will be generated. If it is less than 0.1 µ, the grinding force will be reduced and the streaks formed will be too small to sufficiently prevent "adsorption of the magnetic head".

The amount of at least one material selected from the group consisting of diamond, CBN, alumina and silicon carbide, which is contained in the composition adapted for use in texturing process according to the present invention, is preferably 0.1 to 5% by weight, more preferably 0.2 to 1% by weight of the solution. If the content is less than 0.1% by weight, the efficiency of texturing process will be reduced and the textured streaks will be formed non-uniformly. Even if the content exceeds 5% by weight, no improvement in the efficiency of texturing process and on in the economical advantage will be recognized corresponding thereto. Thus, it is not preferable that the amount of such a material contained in the present composition exceeds 5% by weight from the economical viewpoint.

When a mixture of such minute grains or powder is used, it is preferable that their total amount falls within the range set forth above.

Secondly, an alkylene glycol monoalkyl ether having the general formula:

$R_1O[(CH_2)_nO]m$ in which $R_1$ represents an alkyl group of a straight or branched chain having 1 to 4 carbon atoms, m is an integer of 1 to 3, and n is an integer of 2 or 3, will be referred to, as follows:

Ethylene glycol monomethylether $CH_3OCH_2CH_2OH$,
ethylene glycol monoethylether $C_2H_5OCH_2CH_2OH$,
ethylene glycol monobutylether $C_4H_9OCH_2CH_2OH$,
diethylene glycol monoethylether $CH_3(OCH_2CH_2)_2OH$
diethylene glycol monobutylether $C_2H_5(OCH2CH_2)_2OH$,
diethylene glycol monobutylether $C_4H_9(OCH_2CH_2)_2OH$,
propylene glycol monomethylether $CH_3OCH_2CH_2CH_2OH$,
propylene glycol monoethylether $C_2H_5OCH_2CH_2CH_2OH$,
propylene glycol monobutylether $C_4H_9OCH_2CH_2CH_2OH$,
dipropylene glycol monomethylether$(CH_3(OCH_2CH_2CH_2)_2OH$,
dipropylene glycol monoethylether $C_2H_5(OCH_2CH_2CH_2)_2OH$,
triethylene glycol monomethylether $CH_3 (OCH_2CH_2)_3OH$,
triethylene glycol monoethylether $C_2H_5(OCH_2CH_2)_3OH$, and
tripropylene glycol monomethylether $CH_3(OCH_2CH_2CH_2)_3OH$.

In the specific case, where the texturing composition of the present invention contains no water or is applied without water, it is preferable to use an alkylene glycol monoalkyl ether having a high flash point, e.g., diethylene glycol mono-methyl -ethyl, or -butyl ether, or tripropylene glycol monomethyl ether. Contrary to this, it is not advisable to use ethylene glycol mono-methyl (or -ethyl, or -butyl) ether, the label of which is obliged to clearly indicate that the compound is apprehended to be injurious to health by Article 57 of the Japanese Law on labour safety and hygiene.

The amount of the alkylene glycol monoalkyl ether contained in the texturing composition is preferably in the range of 90 to 99.8% by weight.

Thirdly, fatty acids or metallic salts thereof for use in the texturing composition of the present invention will be described.

As the fatty acids, saturated fatty acids or mono-, di- or tri-unsaturated fatty acids having 10 to 22 carbon atoms, e.g., capric acid, lauric acid, myristic acid, palmitic acid, stearic acid, arachic acid, behenic acid, oleic acid, linolic acid, linoleic acid etc. may be used.

Considering the washability after the texturing process, liquid fatty acids may be preferably used. Among them unsaturated fatty acids are more preferable, and the lower the numbers of carbon atoms they have, the more desirable they are.

Metals Na, Al, Ba, Cd, Ca, Co, Fe, Li, Mg, Mn, Ni, Pb, Zn, Sr etc. may be used as the metals of the salts of the saturated or unsaturated fatty acids set forth above.

Not only one of these fatty acids or metallic salts thereof, but also a mixture of such acids or salts may be used. In addition, it is possible to mix other fatty acids or metallic salts thereof different from those having 10 to 22 carbon atoms. However, it is necessary to mainly use those having 10 to 22 carbon atoms, in order to sufficiently accomplish the object of the present invention.

The amount of the fatty acids or metallic salts thereof contained in the present texturing composition is preferably 0.1 to 5% by weight of the composition. If the amount is less than 0.1% by weight, it is difficult to sufficiently inhibit the occurrence of burrs. If the amount is increased to more than 5% by weight, the effect will not be increased correspondingly thereto, in addition, it will be difficult to form a uniform dispersion of the present texturing composition, and also, in the case where water is mixed thereto, a problem will occur in its solubility, as set forth below.

The composition adapted for use in texturing process of the present invention may contain water, as well as a surfactant, an anticorrosive, an antiseptic, a dispersant, an antifoamer, etc. Generally, the amount of these material, except for water, would be less than about 5% by weight.

The reason why water is added to the present texturing composition will be described as follows: It is desirable that the state of components, except for the minute grains or powder of diamond, CBN, alumina, silicon carbide, is a uniform solution or emulsion. For example, when a metallic salt of a fatty acid, e.g., sodium laurate is a constituent of the present composition, the addition of water contributes to form a more uniform solution. Other reasons for the addition of water are to reduce inflammability and production cost, and also to improve safety of the present texturing composition.

The present texturing composition may contain water not only from the beginning, but also may be diluted with water at the time of its usage. The amount of water is not particularly limited. In the case where water is added to the present composition, the amount of the other components are as follows:

(A) The amount of minute grains or powder of at least one material selected from the group consisting of diamond, CBN, alumina and silicon carbide is preferably 0.1 to 5% by weight of the texturing composition.

(C) The amount of at least one fatty acid having 10 to 22 carbon atoms or metallic salt thereof is preferably 0.1 to 5% by weight of the texturing composition.

Accordingly the amount of an alkylene glycol monoalkyl ether will be decreased to less than 90 to 99.8% by weight of the texturing composition, depending on the content of optional additives, e.g., water etc.

In order to effectively realize the object of the present invention, it is desired that the components, except for minute grains or powder of diamond, CBN, alumina or silicon carbide, preferably constitute a uniform solution, or at least an emulsion. Thus, it is desirable to add a surfactant, in order to uniformly solubilize or emulsify the composition.

By means of cutting grains, i.e., minute grains or powder of diamond, CBN, alumina, or silicon carbide, the present texturing composition effectively forms textured streaks, which are uniformly distributed on the ground layer, particularly on the Ni—P plated ground layer of a magnetic disc, and, thus, entirely inhibits or reduces the occurrence of burrs or protrusions to as few as possible. Such burrs are formed of turned-over remains or deposited dust left in the grooves of textured streaks on the disc substrate.

DESCRIPTION OF THE PREFERRED EMBODIMENTS

The texturing process will be generally described in order to clarify how the texturing composition of the present invention is applied. However, this description should not be recognized to limit the application of the present invention.

A ground layer of Ni—P etc. plated on a substrate of Al alloy etc., or the upper surface of a glass substrate itself (direct ground layer) is textured, and a magnetic layer is formed on the ground layer to obtain a magnetic disc.

The ground layer formed by a plating process is subjected to polishing before the texturing process, so that the surface roughness (Rmax) is preferably 0.05 µm or less.

Figure 1:
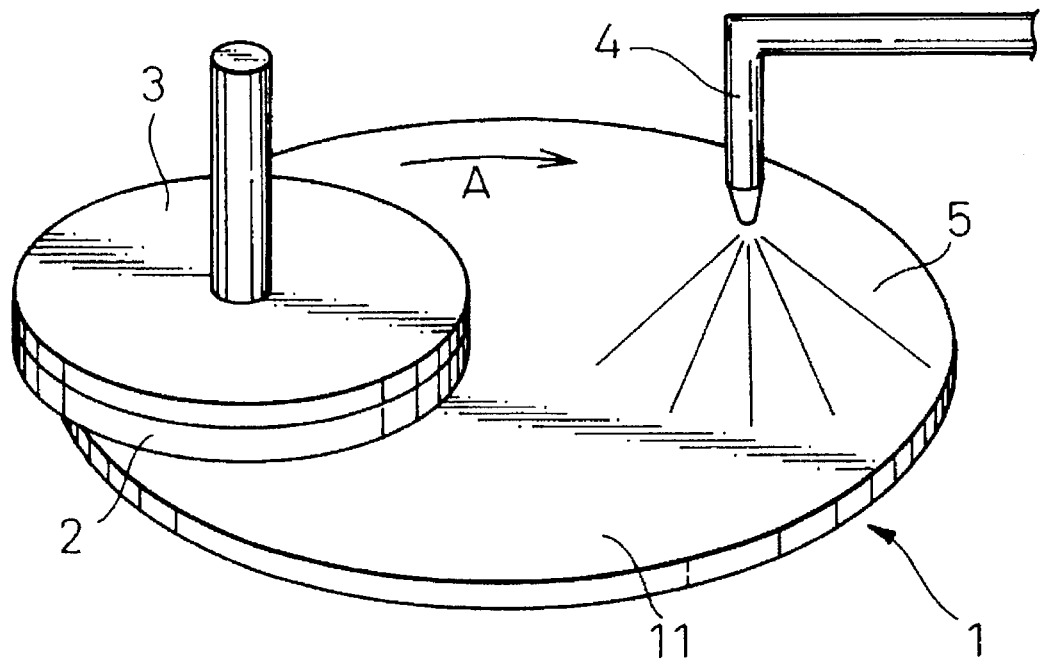
FIG. 1 is a general perspective view of a magnetic disc, to which the texturing composition is applied.

As shown in FIG. 1, while a magnetic disc 1 is rotated, a jig 3, onto which a (felt) sliding pad 2 is adhered, is pressed against the surface of the ground layer 11 of the magnetic disc 1, and the texturing composition 5 is fed on the ground layer 11 from a slurry feeder provided upstream of the sliding pad 2.

As a sliding pad 2, a brush pad of flexible fiber of nylon etc. or a foamed pad of polyurethane may be applied other than a felt pad. The pressure, by which the sliding pad 2 presses the ground layer 11, is preferably in the order of 10 to 50 kPa.

Figure 2:
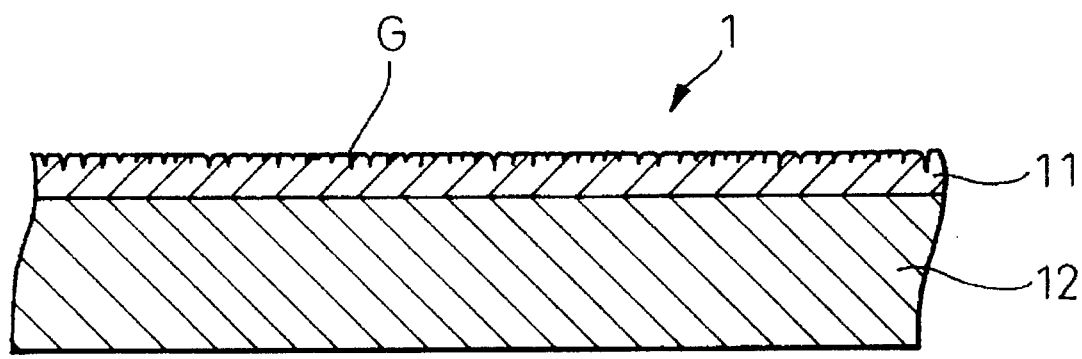
FIG. 2 is a radial sectional view of a magnetic disc, which was subjected to the texturing process.

The rotating rate of the magnetic disc is preferably 50 to 200 r.p.m. If the rotating rate is less than this range, the processing rate will be reduced, and if the rotating rate is more than this range, the ground layer will not be uniformly textured between the inside area and the outside area. The sliding pad may stand still, but it may be rotated in the same direction as that of the magnetic disc 1 at a rotating rate of 1 to 10 r.p.m. Thus, textured streaks G (the sizes of which are exaggerated in FIG. 2 for illustration) are formed as shown in FIG. 2.

The size of textured streaks is generally 0.1 to 5 µm in width and 0.01 to 0.1 µm in depth. If the width is less than 0.1 µm, the effect for inhibiting adsorption of the magnetic head is not sufficient, and if it is more than 5 µm, the frictional force of the magnetic head will become too large for the magnetic head to fly smoothly.

When the streaks are not uniform and very large grooves, e.g., scratches, and also burrs are formed, generally the parameter of surface roughness, i.e., the ratio of the maximum height Rmax/the average roughness Ra becomes large. Contrary to this, when the surface roughness is uniform, Rmax may be small, even if Ra is the same. Thus, the uniformity of streaks expressed by the ratio of Rmax/Ra is preferably 10 or less.

In the example shown in FIG. 1, textured streaks are formed along the direction of the rotation of the disc, i.e., in concentric circles. The streaks formed along the direction of its rotation are parallel to that of relative movement of the magnetic head, and, thus, the streaks do not disturb the magnetic head from freely flying. It is also possible that the circular streaks are regularly formed to cross with each other at a predetermined angle, e.g., 15 degrees. In any event, it is necessary for the magnetic head to fly stably.

A magnetic layer is formed on the textured ground layer 11. A thin magnetic layer (generally, 0.05 to 0.15 µm) is usually formed by means of plating, sputtering or depositing etc., and thus, the streaks appear on the surface of the magnetic layer almost in the same form as that of the textured streaks. Furthermore, a thin protective layer (generally, 0.01 to 0.03 µm) is formed on the magnetic layer, e.g., by means of sputtering a lubricant of carbon etc. Therefore, the surface of the protective layer exhibits nearly the same protrusions as the texturing protrusions.

While the present invention will be described in detail by means of the following examples, the present invention is not limited by these examples. Also, while diethylene glycol monobutyl ether is described as a representative of an alkylene glycol monoalkyl ether, the present invention is not limited to the use of this ether.

Examples 1 to 3

An aluminium substrate 12 prepared for producing a 3.5 inch magnetic disc 1, on which a 10 µm thick ground layer 11 was formed by means of Ni—P plating, was mounted on a texturing machine (Strasburg Co., Model 6DE-DC-SP-1) as shown in FIG. 1, and rotated at 120 r.p.m.

A texturing composition formulated, e.g., as shown in Examples 1 to 3 of Table 1, was sprayed on the ground layer 11 of the magnetic disc 1. 1.5 cc of the composition was sprayed for 0.3 seconds, and stopped. Such spraying was repeated every after 0.7 seconds of interruption.

During such spraying, a jig 3, on which nylon-haired pad 2 of 44 mm in diameter was attached, was rotated in the same direction as that of the magnetic disc 1 and was pressed against the surface of the magnetic disc 1 with a force of 30 kPa. Thus, the texturing process continued for 1 minute.

After finishing the texturing process, the magnetic disc 1 was washed and dried, and the rate of texturing was calculated by the decrease in its weight [(weight before the process)—(weight after the process)]. The uniformity of the textured streaks and the existence of burrs were observed through a differential interference microscope (Olympas Kogaku Kogyo Co., Ltd., BHMJL-33MD, 500 magnifications) and a dark visible field microscope (Olympas Kogaku Kogyo Co., Ltd., BHMJL-33MD, 500 magnifications), and estimated by counting the number of burrs having a diameter of 0.5 µm or more and a height of 0.1 µm or more in a single field of vision. The obtained results are shown in Table 1. The surface roughness of the textured surface (maximum height Rmax and center line average roughness Ra) was measured by means of Talistep and Talidata 2000 (both Lanktailer-Hobson Co.).

In order to estimate CSS characteristics of the magnetic disc, a 100 nm thick Cr layer, a 40 nm thick Co-12Cr-2Ta magnetic layer and a 25 nm thick carbon protective layer were sequentially formed by means of DC sputtering, and finally a lubricant was coated in a thickness of 2 nm on the textured ground layer 11. The obtained magnetic disc was incorporated into a hard disc-drive with an altic head (load of magnetic head: 5g), and accelerated to rotate at 3,600 r.p.m. from the stational position, using perfluoropolyether as a lubricant, and, then, stopped. Such cycles of contact start and stop (CSS cycles) were repeated, and the relationship between the number of CSS cycles and the coefficient of friction µ was measured as shown in Table 1.

In Table 1, the coefficient of friction µ was measured after 20,000 cycles for a magnetic disc which withstood 20,000 CSS cycles. For a magnetic disc which was destroyed earlier than 20,000 cycles, the number of CSS cycles counted at the time of destruction was indicated. In Examples 1 to 3, all magnetic discs withstood up to 20,000 CSS cycles.

Examples 4 to 8

The texturing compositions of Examples 4 to 8 were prepared by adding diamond powder, diethylene glycol monobutyl ether and a respective fatty acid, each in the amount shown in Table 1, into pure water, and dispersing them by applying ultrasound. The amount of pure water can be calculated by subtracting the total amount of the three components shown in Table 1 from 100% by weight of the composition.

Diethylene glycol monobutyl ether was added in the minimum amount necessary to formulate a uniform solution of the additives except for diamond powder, but not in an amount sufficient to form an emulsion.

The texturing compositions of Examples 4 to 8 were subjected to texturing tests and estimation in the same manner as those of Examples 1 to 3, and the obtained results were shown in Table 1.

TABLE 1

Examples 1 to 8

| Ex. No. | Powder of diamond (average size: 2 μm) (wt %) | Diethylene glycol monobutyl ether (wt %) | Fatty acid (wt %) | | Rate of Texturing (μm/min) | Surface Roughness | | Uniformity of Streaks Rmax/Ra | Number of Burrs | CSS Characteristics (Coefficient of Friction μ) (μ) |
|---|---|---|---|---|---|---|---|---|---|---|
| | | | | | | Ra (Å) | Rmax (Å) | | | |
| 1 | 0.4 | 98.6 | Lauric acid | 1 | 0.16 | 46 | 285 | 6.2 | 0 | 0.4 |
| 2 | 0.4 | 98.6 | Palmitic acid | 1 | 0.13 | 40 | 248 | 6.2 | 0 | 0.5 |
| 3 | 0.4 | 98.6 | Oleic acid | 1 | 0.15 | 45 | 275 | 6.1 | 0 | 0.5 |
| 4 | 0.4 | 20 | Lauric acid | 1 | 0.17 | 48 | 298 | 6.2 | 0 | 0.4 |
| 5 | 0.4 | 40 | Millistic acid | 1 | 0.15 | 45 | 275 | 6.1 | 0 | 0.5 |
| 6 | 0.4 | 60 | Palmitic acid | 1 | 0.14 | 40 | 252 | 6.3 | 0 | 0.5 |
| 7 | 0.4 | 90 | Stearic acid | 1 | 0.13 | 43 | 271 | 6.3 | 0 | 0.6 |
| 8 | 0.4 | 20 | Oleic acid | 1 | 0.16 | 46 | 276 | 6.0 | 0 | 0.5 |

Examples 9 to 13

The texturing compositions 9 to 13 were prepared and tested in the same manner as those of Examples 4 to 8, except that each of fatty acids was replaced by the sodium salt thereof. The obtained results were shown in Table 2.

Examples 14 to 19

The texturing compositions were prepared in the same manner as those of Examples 5 to 8, except that oleic acid was used as a fatty acid and the amount thereof was in the range of 0.05 to 10% by weight, and subjected to texturing tests except for the estimation of CSS characteristics.

The amount of diethylene glycol monobutyl ether was the minimum amount necessary to formulate a uniform solution of the components except for diamond powder.

As can be seen from Table 2, the optimum amount of oleic acid was 0.5 to 5% by weight. When its amount was 0.05% by weight, its effect was not sufficient to inhibit the occurrence of burrs. The effect clearly appeared with the amount of 0.1% by weight or more, and the effect further increased with the amount of 0.5% by weight or more. However, when its amount exceeded 5% by weight, diethylene glycol monobutyl ether necessary to uniformly mix the oleic acid into pure water was increased.

The desirable amount of a fatty acid or a salt thereof was different with each other, and also the amount of an alkylene glycol monoalkyl ether necessary to formulate a uniform solution was different corresponding thereto.

TABLE 2

Examples 9 to 19

| Ex. No. | Powder of diamond (average size: 2 μm) (wt %) | Diethylene glycol monobutyl ether (wt %) | Fatty acid or salt thereof (wt %) | | Rate of Texturing (μm/min) | Surface Roughness | | Uniformity of Streaks Rmax/Ra | Number of Burrs | CSS Characteristics (Coefficient of Friction μ) (μ) |
|---|---|---|---|---|---|---|---|---|---|---|
| | | | | | | Ra (Å) | Rmax (Å) | | | |
| 9 | 0.4 | 20 | Na laurate | 1 | 0.16 | 45 | 270 | 6.0 | 0 | 0.4 |
| 10 | 0.4 | 40 | Na millistate | 1 | 0.15 | 48 | 302 | 6.3 | 0 | 0.5 |
| 11 | 0.4 | 60 | Na palmitate | 1 | 0.15 | 47 | 291 | 6.2 | 0 | 0.5 |
| 12 | 0.4 | 90 | Na stearate | 1 | 0.12 | 40 | 240 | 6.0 | 0 | 0.5 |
| 13 | 0.4 | 20 | Na oleate | 1 | 0.16 | 40 | 240 | 6.0 | 0 | 0.4 |
| 14 | 0.4 | 20 | Oleic acid | 0.05 | 0.20 | 65 | 618 | 9.5 | 50 | — |
| 15 | 0.4 | 20 | Oleic acid | 0.1 | 0.18 | 55 | 385 | 7.0 | 5 | — |
| 16 | 0.4 | 20 | Oleic acid | 0.5 | 0.17 | 49 | 309 | 6.3 | 0 | — |
| 17 | 0.4 | 20 | Oleic acid | 1.0 | 0.16 | 46 | 276 | 6.0 | 0 | — |
| 18 | 0.4 | 30 | Oleic acid | 5.0 | 0.15 | 44 | 255 | 5.8 | 0 | — |
| 19 | 0.4 | 70 | Oleic acid | 10.0 | 0.10 | 45 | 270 | 6.0 | 0 | — |

Examples 20 to 33

As can be seen from Table 3, texturing compositions were prepared in the same manner as those of Examples 4 to 8, except that various amounts of diamond powder having various grain sizes were used in certain examples, and fused alumina or silicon carbide were used instead of diamond in the other Examples. They were subjected to the same texturing tests as those of Examples 1 to 3, and the obtained results were shown in Table 3.

TABLE 3

Examples 20 to 33

| Ex. No. | Minute grains or powder (μm) (wt %) | | | Diethylene glycol monobutyl alcohol (wt %) | Fatty acid or salt thereof (wt %) | | Rate of Texturing (μm/min) | Surface Roughness | | Uniformity of Streaks Rmax/Ra | Number of Burrs | CSS Characteristics (Coefficient of Friction μ) (μ) |
|---|---|---|---|---|---|---|---|---|---|---|---|---|
| | | | | | | | | Ra (Å) | Rmax (Å) | | | |
| 20 | fused alumina | 2 | 0.4 | 20 | Oleic acid | 1 | 0.05 | 42 | 256 | 6.1 | 0 | 0.7 |
| 21 | diamond | 3 | 0.4 | 20 | Na laurate | 1 | 0.19 | 55 | 332 | 6.0 | 0 | 0.5 |
| 22 | diamond | 2 | 2 | 20 | Na laurate | 1 | 0.16 | 45 | 275 | 6.1 | 0 | 0.4 |
| 23 | diamond | 2 | 1 | 20 | Na laurate | 1 | 0.17 | 45 | 271 | 6.0 | 0 | 0.4 |
| 24 | diamond | 2 | 0.2 | 20 | Na laurate | 1 | 0.15 | 45 | 271 | 6.0 | 0 | 0.4 |
| 25 | diamond | 1 | 0.4 | 20 | Na laurate | 1 | 0.09 | 30 | 184 | 6.1 | 0 | 0.4 |
| 26 | fused alumina | 3 | 0.4 | 20 | Na laurate | 1 | 0.06 | 50 | 305 | 6.1 | 0 | 0.7 |
| 27 | fused alumina | 2 | 2 | 20 | Na laurate | 1 | 0.05 | 43 | 263 | 6.1 | 0 | 0.7 |
| 28 | fused alumina | 2 | 1 | 20 | Na laurate | 1 | 0.05 | 42 | 257 | 6.1 | 0 | 0.7 |
| 29 | fused alumina | 2 | 0.2 | 20 | Na laurate | 1 | 0.05 | 41 | 255 | 6.2 | 0 | 0.7 |
| 30 | fused alumina | 1 | 0.4 | 20 | Na laurate | 1 | 0.05 | 32 | 200 | 6.3 | 0 | 0.7 |
| 31 | silicon carbide | 3 | 0.4 | 20 | Na laurate | 1 | 0.10 | 42 | 263 | 6.3 | 0 | 0.8 |
| 32 | silicon carbide | 2 | 0.4 | 20 | Na laurate | 1 | 0.09 | 38 | 241 | 6.3 | 0 | 0.7 |
| 33 | silicon carbide | 1 | 0.4 | 20 | Na laurate | 1 | 0.07 | 30 | 185 | 6.2 | 0 | 0.7 |

Comparative 1

Diamond powder as used in Example 1 was added in the amount of 0.4% by weight into pure water and dispersed by ultrasonic wave. Thus, a composition was formulated without a diethylene glycol monoalkyl ether or a fatty acid or a salt thereof. The composition was subjected to the same texturing tests as those of Example 1. The obtained results were shown in Table 4.

As can be seen from Table 4, the surface roughness was remarkably inferior to those of the Examples. The ratio of Rmax/Ra which represents the uniformity of streaks was about 2 times as large as those of the Examples, i.e., inferior thereto.

In addition, many burrs were counted and the magnetic head was broken only after 8,000 CSS test cycles.

Comparative 2

Fused alumina powder as used in Example 20 was added in an amount of 0.4% by weight into pure water, and dispersed by ultrasound. Thus, a composition was formulated without a diethylene glycol monoalkyl ether or a fatty acid or a salt thereof. The composition was subjected to the same texturing texts as those of Example 1. The obtained results were shown in Table 4.

Comparatives 3 to 4

Diamond powder as used in Example 1 was mixed in an amount of 0.4% by weight to a mixture of pure water and diethylene glycol monobutyl ether, in order to formulate a composition of Comparative 3 without a fatty acid or a salt thereof.

The same amount of diamond as used in Comparative 3 was mixed to diethylene glycol monobutyl ether solely, in order to formulate a composition of Comparative 4 without a fatty acid or a salt thereof.

Then, these compositions were subjected to the same texturing tests as those of Example 1. The results are shown in Table 4.

TABLE 4

Comparatives 1 to 4

| Com. Ex. No. | Minute grains or powder (μm) (wt %) | | | Diethylene glycol monobutyl ether (wt %) | Fatty acid or salt thereof (wt %) | Rate of Texturing (μm/min) | Surface Roughness | | Uniformity of Streaks Rmax/Ra | Number of Burrs | CSS Characteristics (CSS cycles at which magnetic head broke) |
|---|---|---|---|---|---|---|---|---|---|---|---|
| | | | | | | | Ra (Å) | Rmax (Å) | | | |
| 1 | diamond | 2 | 0.4 | 0 | 0 | 0.23 | 93 | 1116 | 12.0 | 200 | 8000 |
| 2 | fused alumina | 2 | 0.4 | 0 | 0 | 0.05 | 47 | 395 | 8.4 | 400 | 3000 |
| 3 | diamond | 2 | 0.4 | 20 | 0 | 0.13 | 68 | 518 | 7.6 | 150 | 11000 |
| 4 | diamond | 2 | 0.4 | 99.6 | 0 | 0.16 | 66 | 495 | 7.5 | 150 | 11000 |

The texturing composition of the present invention exhibits the following effects superior to those of the prior art:
(1) No burrs or very few burrs are produced.
(2) The surface roughness is small, and the textured streaks are formed uniformly.
(3) The CSS characteristics is extremely good, and the recording error is reduced and the density of recording is improved.

While preferred embodiments of the present invention have been described using specific terms, such description is for illustration only, and it is to be understood that changes and variations may be made without departing from the spirit or scope of the following claims.

I claim:

1. A composition adapted for use in a texturing process of a magnetic disc, comprising:
   (A) minute grains or powder of at least one material selected from the group consisting of diamond, CBN, alumina and silicon carbide;
   (B) an alkylene glycol monoalkyl ether having the general formula:

$R_1O[(CH_2)_nO]_mH$ wherein $R_1$ represents a straight or branched chain of an alkyl group having 1 to 4 carbon atoms, m is an integer of 1 to 3, and n is an integer of 2 or 3; and
   (C) at least one compound selected from the group of a fatty acids having 10 to 22 carbon atoms or a metallic salt thereof.

2. A composition according to claim 1, wherein the maximum size of said minute grains or powder is 5 μm or less.

3. A composition according to claim 1, wherein the average size of said minute grains or powder is in the range of 0.1 to. 3 μm.

4. A composition according to claim 1, wherein the minute grains or powder is present in the range of 0.1 to 5% by weight of said composition.

5. A composition according to claim 1, wherein said fatty acid is a saturated or a mono-, di- or tri-unsaturated fatty acid having 10 to 22 carbon atoms, and said metallic salt is a metallic salt of said fatty acid set forth above.

6. A composition according to claim 1, wherein said fatty acid is selected from the group consisting of capric acid, lauric acid, myristic acid, palmitic acid, stearic acid, arachic acid, behenic acid, oleic acid, linolic acid, and linoleic acid.

7. A composition according to claim 1, wherein said metallic salt of said fatty acid is a salt of a metal selected from the group consisting of Na, Al, Ba, Cd, Ca, Co, Fe, Li, Mg, Mn, Ni, Pb, Zn and Sr.

8. A composition according to claim 1, wherein the of said fatty acid or said salt thereof is present in the range of 0.1 to 5% by weight of said composition.

9. A composition according to claim 1, wherein said alkylene glycol monoalkyl ether is selected from the group consisting of:
ethylene glycol monomethylether $CH_3OCH_2CH_2OH$,
ethylene glycol monoethylether $C_2H_5OCH_2CH_2OH$,
ethylene glycol monobutylether $C_4H_9OCH_2CH_2OH$,
diethylene glycol monomethylether $CH_3(OCH_2CH_2)_2OH$,
diethylene glycol monoethylether $CH_2H_5(OCH_2CH_2)_2OH$,
diethylene glycol monobutylether $C_4H_9(OCH_2CH_2)_2OH$,
propylene glycol monomethylether $CH_3OCH_2CH_2CH_2OH$,
propylene glycol monoethylether $C_2H_5OCH_2CH_2CH_2OH$,
propylene glycol monobutylether $C_4H_9OCH_2CH_2CH_2OH$,
dipropylene glycol monomethylether $CH_3(OCH_2CH_2CH_2)_2OH$,
dipropylene glycol monoethylether $C_2H_5(OCH_2CH_2CH_2)_2OH$,
triethylene glycol monomethylether $CH_3(OCH_2CH_2)_3OH$,
triethylene glycol monoethylether $C_2H_5(OCH_2CH_2)_3OH$, and
tripropylene glycol monomethylether $CH_3(OCH_2CH_2CH_2)_3OH$.

10. A composition according to claim 1, of said alkylene glycol monoalkyl ether is present in the range of 90 to 99.8% by weight of said composition.

11. A composition according to claim 1, further comprising an optional additive selected from the group consisting of water, a surfactant, an anticorrosive, an antiseptic, a dispersant, and an antifoamer, said additives, except water, present in an amount of 5% or less of the weight of said composition.

12. A composition according to claim 11, wherein the amount of said alkylene glycol monoalkyl ether is present in the range of the amount of 90 to 99.8% by weight of said solution less the amount of said optional additives.

* * * * *